(12) United States Patent
Takeuchi

(10) Patent No.: US 8,325,445 B2
(45) Date of Patent: Dec. 4, 2012

(54) HEAD-SLIDER CONFIGURED TO HAVE MULTIPLE DEPTH SURFACES TO AVOID CONTACT WITH A MAGNETIC-RECORDING DISK WHEREIN A LEADING SIDE SURFACE IS DEEPER THAN A NEGATIVE PRESSURE DEEP RECESSED SURFACE

(75) Inventor: Yoshinori Takeuchi, Ibaraki-ken (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 190 days.

(21) Appl. No.: 12/646,108

(22) Filed: Dec. 23, 2009

(65) Prior Publication Data

US 2011/0157749 A1 Jun. 30, 2011

(30) Foreign Application Priority Data

Dec. 25, 2008 (JP) ................................. 2008-330869

(51) Int. Cl.
*G11B 5/60* (2006.01)
(52) U.S. Cl. .................................................. 360/235.6
(58) Field of Classification Search ................ 360/235.6
See application file for complete search history.

(56) References Cited

U.S. PATENT DOCUMENTS

| 5,777,825 A | 7/1998 | Dorius |
| 6,373,661 B1 | 4/2002 | Tokuyama et al. |
| 2006/0139810 A1 | 6/2006 | Hashimoto et al. |
| 2007/0030597 A1 | 2/2007 | Watanabe et al. |
| 2007/0188925 A1 * | 8/2007 | Ishihara ..................... 360/235.8 |

FOREIGN PATENT DOCUMENTS

JP 2002133632 5/2002

* cited by examiner

*Primary Examiner* — Allen Heinz

(57) ABSTRACT

A head-slider. The head-slider includes a magnetic-recording head and an air-bearing surface. The air-bearing surface includes air-bearing portions, shallow-recessed surfaces, and a deep-recessed surface. Air-bearing portions are configured to fly nearest to a magnetic-recording disk; shallow-recessed surfaces have a first depth from the air-bearing portions; the deep-recessed surface has a second depth, larger than the first depth, from the air-bearing portions. Air-bearing portions and shallow-recessed surfaces are configured to generate positive pressure; and, the deep-recessed surface is configured to generate negative pressure. A shallow-recessed surface is disposed near a leading edge of the head-slider; air-bearing portions are preceded and abutted by the shallow-recessed surface; a plurality of small leading-end pads are disposed near a leading edge, and at least at each side of the shallow-recessed surface near lateral sides, of the head-slider; and, a leading-end deep-recessed surface is disposed at a leading side of the leading-end pads.

14 Claims, 11 Drawing Sheets

HEAD-SLIDER CONFIGURED TO HAVE MULTIPLE DEPTH SURFACES TO AVOID CONTACT WITH A MAGNETIC-RECORDING DISK WHEREIN A LEADING SIDE SURFACE IS DEEPER THAN A NEGATIVE PRESSURE DEEP RECESSED SURFACE

CROSS-REFERENCE TO RELATED APPLICATION

This application claims priority from the Japanese Patent Application No. 2008-330869, filed Dec. 25, 2008, the disclosure of which is incorporated herein in its entirety by reference.

TECHNICAL FIELD

Embodiments of the present invention relate to head-sliders for use in hard-disk drives (HDDs).

BACKGROUND

With the increase of recording densities in HDDs, the magnetic spacing, also known by the term of art, "fly height," between a magnetic-recording head and a recording surface of a magnetic-recording disk has narrowed; and, securing the reliability of the HDD from deleterious head-disk interactions (HDIs) has become an issue of greater concern to engineers and scientists engaged in HDD manufacturing and development. In a HDD, an air-bearing head-slider is used which flies above a spinning magnetic-recording disk at a very small fly height.

As is known in the art, the basic configuration of a prior art head-slider 101 used in a HDD is shown in FIG. 11, which shows a perspective view of such a head-slider 101. The air-bearing surface (ABS) of the head-slider 101 includes: air-bearing portions 102; shallow-recessed surfaces 104, which are slightly recessed from the air-bearing portions 102; and, a deep-recessed surface 105, which is etched deeper than the shallow-recessed surfaces 104 from the air-bearing portions 102. The air-bearing portions 102 include: a pair of left and right air-bearing portions 102a and 102b, which occupy rear portions of the leading-end shallow-recessed surface 104a; and, a center pad 102c including a magnetic-recording head 103 disposed in proximity to the trailing edge of the head-slider 101. The deep-recessed surface 105 is partially surrounded by the leading-end shallow-recessed surface 104a, the leading-end air-bearing portions 102a and 102b and the side shallow recessed rails 104b. In this configuration, while the stepped air-bearing action by the shallow-recessed surfaces and the air-bearing portions generates lift to lift the head-slider off the magnetic-recording disk, a negative pressure is also generated by the deep-recessed surface 105. By using both positive and negative pressures, a suitable air bearing stiffness may be provided for stable flight of the head-slider 101 that serves to maintain the magnetic-recording head 103 of the center pad as the nearest point to the magnetic-recording disk. Thus, this configuration may be said to be offer high performance for the head-slider 101. Currently, two kinds of head-sliders are widely used: one has length Lx=1.25 millimeters (mm), width Ly=0.7 mm, and thickness Lz=0.23 mm; and, another has length Lx=0.85 mm, width Ly=0.7 mm, and thickness Lz=0.23 mm.

In a HDD employing a head-slider load/unload system, especially if the magnetic-recording disk rotation speed is as high as 7200 rpm, 10 krpm, 15 krpm, or similar high rotation speeds, the head-slider may touch the magnetic-recording disk without developing a lift during load, because the head-slider is dropped onto the magnetic-recording disk at high speed. To prevent damage to both head-slider and magnetic-recording disk, the head-slider must be able to immediately initiate stable flight above the magnetic-recording disk by generating a lift even in such a situation.

Engineers and scientists engaged in HDD manufacturing and development are interested in the design of HDDs that control the fly height and variations in the fly height between the head-slider and the recording surface of the magnetic-recording disk to meet the rising demands of the marketplace for increased data-storage capacity, performance, and reliability.

SUMMARY

Embodiments of the present invention include a head-slider. The head-slider includes: an air-bearing surface, and a magnetic-recording head for reading data from, and writing data to, a magnetic-recording disk, such that the head-slider is configured to fly in proximity with a recording surface of the magnetic-recording disk by an air-bearing effect. The air-bearing surface includes: air-bearing portions, shallow-recessed surfaces, and a deep-recessed surface. The air-bearing portions are configured to fly nearest to the magnetic-recording disk; the shallow-recessed surfaces have a first depth from the air-bearing portions; the deep-recessed surface has a second depth from the air-bearing portions; and, the second depth is larger than the first depth. The air-bearing portions and the shallow-recessed surfaces are configured to generate positive pressure; and, the deep-recessed surface, which is partially surrounded by the shallow-recessed surfaces and the air-bearing portions, is configured to generate negative pressure. A shallow-recessed surface is disposed in proximity of a leading edge of the head-slider; air-bearing portions are disposed such that the air-bearing portions are preceded and abutted by the shallow-recessed surface; a plurality of small leading-end pads having the same height as the air-bearing portions are disposed in proximity of the leading edge of the head-slider at least at each side of the shallow-recessed surface in proximity of lateral sides of the head-slider; and, a leading-end deep-recessed surface is disposed at a leading side of the leading-end pads.

DESCRIPTION OF THE DRAWINGS

The accompanying drawings, which are incorporated in and form a part of this specification, illustrate embodiments of the invention and, together with the description, serve to explain the embodiments of the present invention:

in FIG. 4(a), normal flight of a head-slider; in FIG. 4(b), a pitch-down attitude of a head-slider causing a head-disk interaction (HDI); in FIG. 4(c), a prior art example of a head-slider used to mitigate a HDI; and, in FIG. 4(d), the first example of the head slider, in accordance with an embodiment of the present invention, used to mitigate a HDI.

Figure 1:
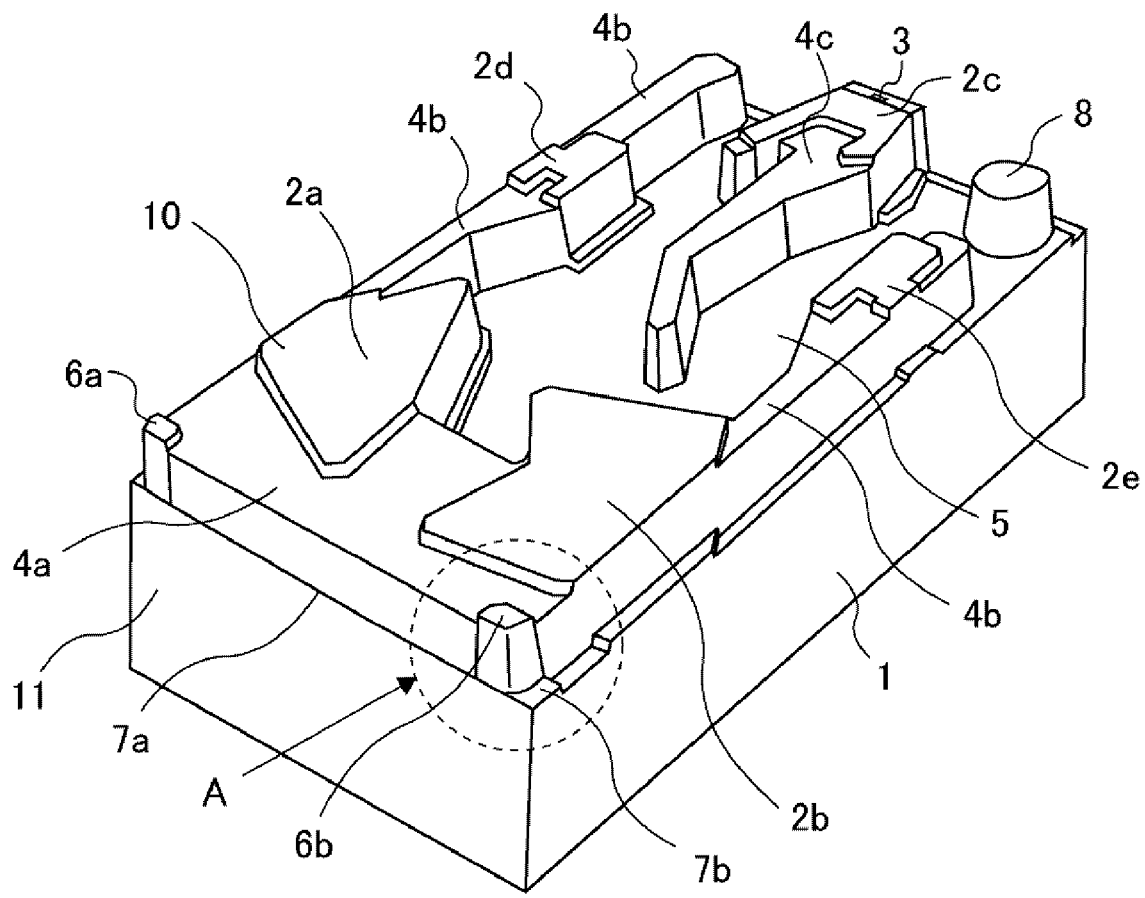
FIG. 1 is a perspective view of the air-bearing surface (ABS) of a head-slider of a first example, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

The following nomenclature is used herein to identify various portions of the slider and head-slider based on the configuration of the head-slider when in a flying relationship with the magnetic-recording disk: a trailing edge is located at the side of the head-slider configured such that an air-stream departs from the head-slider; a leading edge is located at the side of the head-slider configured such that the air-stream approaches the head-slider; an outside diameter (OD) side of the head-slider faces nominally in a direction directed towards the OD of the magnetic-recording disk; and, an inside diameter (ID) side of the head-slider faces nominally in a direction directed towards the ID of the magnetic-recording disk. As used herein, both the OD side and the ID side of the head-slider, slider, or portions of the ABS are referred to as lateral sides of the head-slider, slider, or portions of the ABS. As used herein, a leading end of portions of the ABS, the slider, and the head-slider is disposed closer to the leading edge of the head-slider than the trailing edge of the head-slider; and, a trailing end of portions of the ABS, the slider, and the head-slider is disposed closer to the trailing edge of the head-slider than the leading edge of the head-slider. As used herein, a leading side of portions of the ABS, the slider, and the head-slider faces towards the leading edge of the head-slider; and, a trailing side of portions of the ABS, the slider, and the head-slider faces towards the trailing edge of the head-slider.

Also, as used herein, an air bearing and air-bearing are terms of art that apply to fluid-dynamic or aero-dynamic surfaces, effects, and devices when gases other than air are in use; and, therefore, the terms of art, air bearing and air-bearing, include within their scope the terms of art, gas bearing and gas-bearing.

Description of Embodiments of the Present Invention for a Head-Slider Configured to Avoid Contact with a Magnetic-Recording Disk, a Hard-Disk Drive Including the Head-Slider, and a Method for Manufacturing the Head-Slider In the case of a head-slider having the above-described basic configuration, with relevance to embodiments of the present invention, if the head-slider touches the magnetic-recording disk, the head-slider leans forward, which means that the leading side of the head-slider turns downward. If the leading end of the head-slider makes contact with the magnetic-recording disk, the air inlet may be blocked, resulting in a pronounced decrease of the air inflow. In this case, since lift can not be generated, contact sliding occurs continuously between the head-slider and the magnetic-recording disk, causing damage to both.

Figure 11:
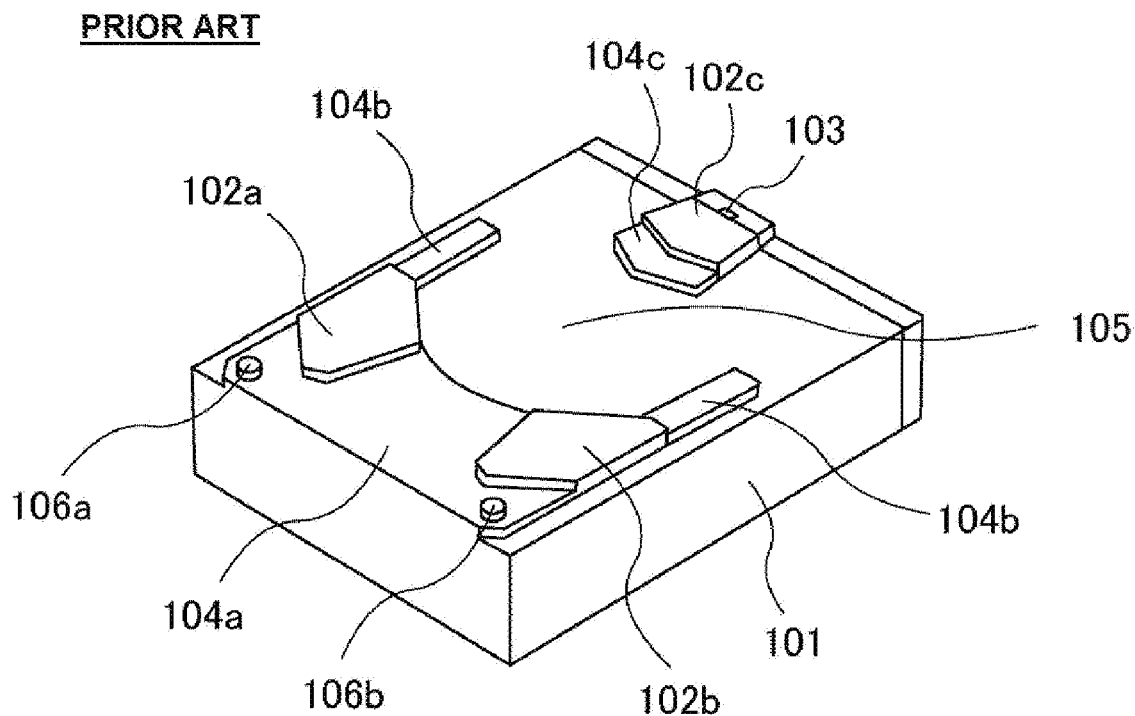
FIG. 11 is a perspective view of the ABS of a head-slider which utilizes both positive and negative pressures and employs prior art leading-end pads.

To deal with this, one head-slider, known in the art, has air-bearing portions and very shallow-recessed surfaces. The leading-end shallow-recessed surface includes minute bumps 106a and 106b (see FIG. 11) disposed on the leading-end shallow-recessed surface near the respective leading-end corners. The minute bumps are almost as high as the air-bearing portions. These minute bumps prevent the leading edge of the shallow-recessed surface from damaging the surface of the magnetic-recording disk, if the head-slider touches the magnetic-recording disk. Even if the head-slider leans forward, the head-slider can immediately obtain lift to avoid the forward leaning situation, because air inflow can be maintained.

As is also known in the art, the minute bumps may be substantially circular and located somewhat apart from the leading edge in order to prevent them from overlapping with the leading edge due to pattern shift or other process fluctuations. Thus, the minute bumps are abutted by the leading-end shallow-recessed surface before the leading edge. Since the height of the minute bumps is equal to the depth of the shallow-recessed surface, the contact point may move from the minute bumps to the leading edge of the shallow-recessed surface, if the forward leaning angle enlarges. Under these circumstances, since the effect of the minute bumps may be nullified, contact sliding may occur continuously between the forward leaning head-slider and the magnetic-recording disk, causing damage to both.

Embodiments of the present invention provide means to increase the sliding reliability of the HDD by forming leading-end pads so as to ensure that forward leaning hardly occurs; and, even in the event that contact occurs at a large forward leaning angle, the head-slider can maintain an air inflow inlet and immediately obtain lift to avoid the forward leaning situation without causing damage to the magnetic-recording disk. Thus, embodiments of the present invention are characterized in that a deep-recessed surface is disposed at the leading side of the leading-end pads.

In accordance with embodiments of the present invention, the head-slider includes: an air-bearing surface, and a magnetic-recording head for reading data from, and writing data to, a magnetic-recording disk, such that the head-slider is configured to fly in proximity with a recording surface of the magnetic-recording disk by an air-bearing effect. In accordance with embodiments of the present invention, the air-bearing surface includes: air-bearing portions, shallow-recessed surfaces, and a deep-recessed surface. In accordance with embodiments of the present invention, the air-bearing portions are configured to fly nearest to the magnetic-recording disk; the shallow-recessed surfaces have a first depth from the air-bearing portions; the deep-recessed surface has a second depth from the air-bearing portions; and, the second depth is larger than the first depth. In accordance with embodiments of the present invention, the air-bearing portions and the shallow-recessed surfaces are configured to generate positive pressure; and, the deep-recessed surface, which is partially surrounded by the shallow-recessed surfaces and the air-bearing portions, is configured to generate negative pressure. In accordance with embodiments of the present invention, a shallow-recessed surface is disposed in proximity of a leading edge of the head-slider; air-bearing portions are disposed such that the air-bearing portions are preceded and abutted by the shallow-recessed surface; a plurality of small leading-end pads having the same height as the air-bearing portions are disposed in proximity of the leading edge of the head-slider at least at each side of the shallow-recessed surface in proximity of lateral sides of the head-slider; and, a leading-end deep-recessed surface is disposed at a leading side of the leading-end pads.

In addition, in accordance with further embodiments of the present invention, the head-slider includes: an air-bearing surface, and a magnetic-recording head for reading data from, and writing data to, a magnetic-recording disk, such that the head-slider is configured to fly in proximity with a recording surface of the magnetic-recording disk by an air-bearing effect. In accordance with further embodiments of the present invention, the air-bearing surface includes: air-bearing portions, shallow-recessed surfaces, and a first deep-recessed surface. In accordance with further embodiments of the present invention, the air-bearing portions are configured to fly nearest to the magnetic-recording disk; the shallow-recessed surfaces have a first depth from the air-bearing portions; the first deep-recessed surface has a second depth from the air-bearing portions; and, the second depth is larger than the first depth. In accordance with further embodiments of the present invention, the air-bearing portions and the shallow-recessed surfaces are configured to generate positive pressure; and, the first deep-recessed surface, which is partially surrounded by the shallow-recessed surfaces and the air-bearing portions, is configured to generate negative pressure. In accordance with further embodiments of the present invention, a shallow-recessed surface is disposed in proximity of a leading edge of the head-slider; air-bearing portions are disposed such that the air-bearing portions are preceded and abutted by the shallow-recessed surface; a plurality of small leading-end pads having the same height as the air-bearing portions are disposed in proximity of the leading edge of the head-slider at least at each side of the shallow-recessed surface in proximity of lateral sides of the head-slider; and, a second deep-recessed surface deeper than the first deep-recessed surface is disposed at a leading side of the leading-end pads.

Embodiments of the present invention also include within their scope an HDD including head-sliders of embodiments of the present invention described herein.

Moreover, in accordance with embodiments of the present invention, a method for manufacturing a head-slider includes: processing the shallow-recessed surfaces to the first depth without processing the air-bearing portions and the small leading-end pads; processing a deep-recessed surface to the second depth without processing the air-bearing portions, the small leading-end pads, and the shallow-recessed surfaces; and, forming a leading-end deep-recessed surface at the leading side of the small leading-end pads.

In another embodiment of the present invention, the deep-recessed surface at the leading side of the small leading-end pads is formed by reactive ion etching.

In another embodiment of the present invention, the deep-recessed surface at the leading side of the small leading-end pads is formed by ion milling.

Embodiments of the present invention provide for sliding reliability of the HDD, because due to a deep-recessed surface disposed at the leading end in front of the leading-end pads, forward leaning hardly occurs; and, even in the event contact occurs at a large forward leaning angle, the head-slider can maintain an air inflow inlet and immediately obtain lift to avoid the forward leaning situation without causing damage to the magnetic-recording disk. In addition, in accordance with embodiments of the present invention, since the leading end of the ABS of the head-slider is defined by a milling process in which a mask is used, variation in fly height of the head-slider may be reduced by increasing accuracy of the head-slider length, or alternatively, by suppressing variation in the head-slider length.

Example 1

Figure 2:
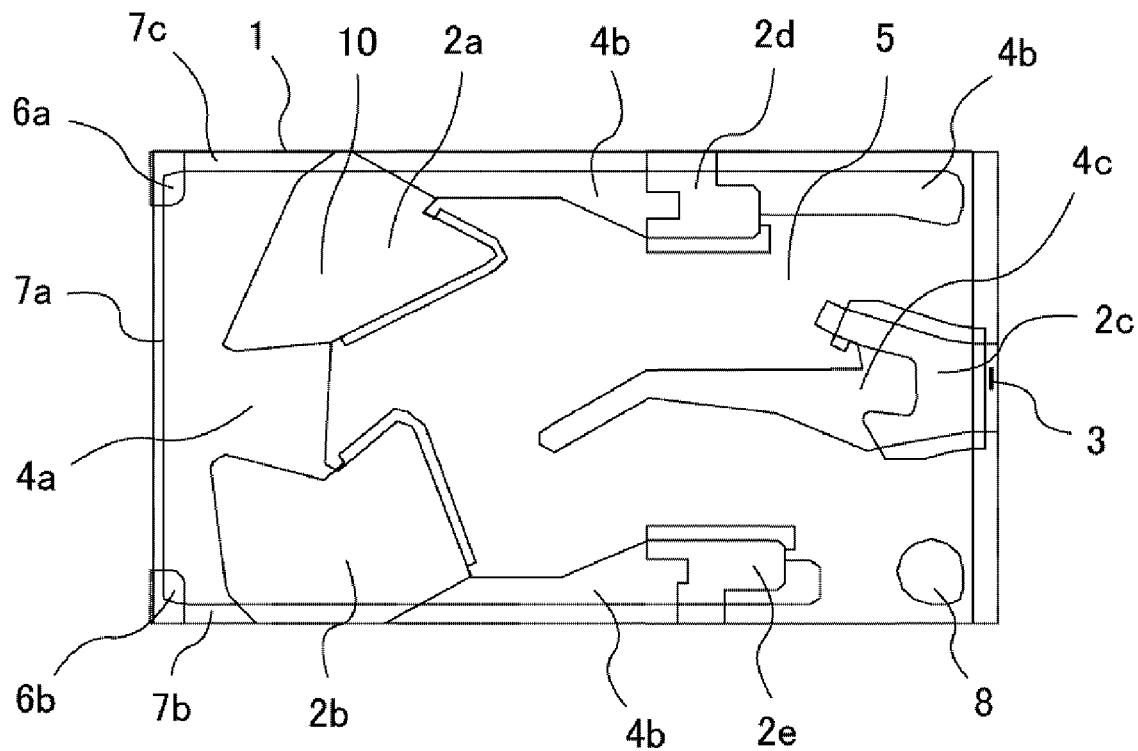
FIG. 2 is a plan view of the ABS of the head-slider of FIG. 1 of the first example, in accordance with an embodiment of the present invention.
Figure 3:
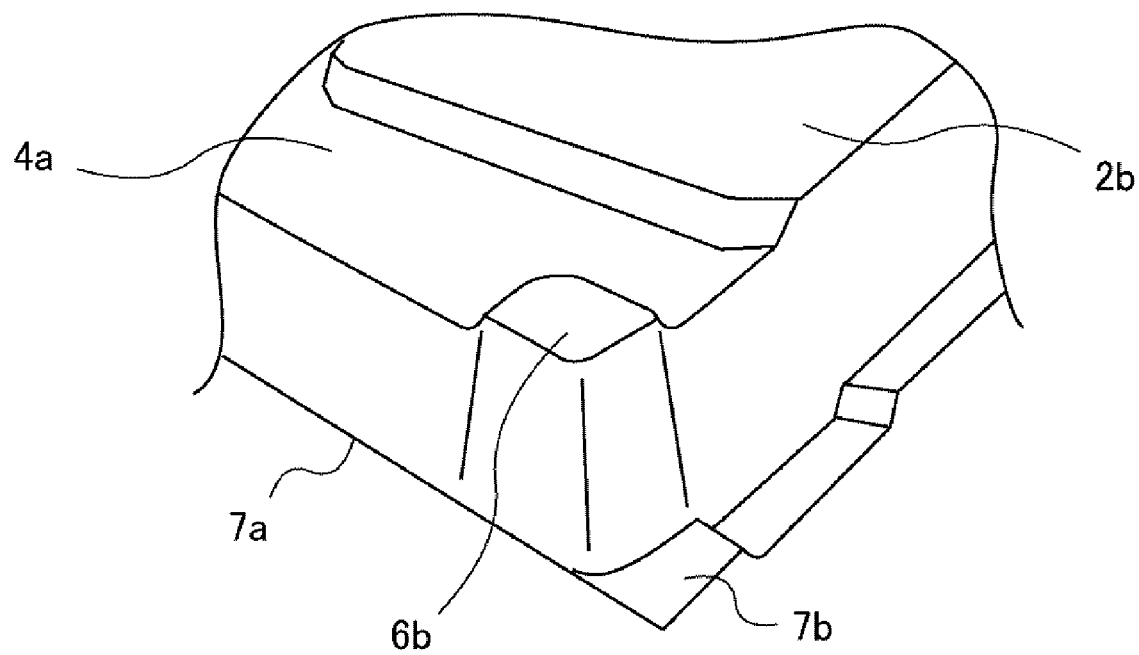
FIG. 3 is an enlarged view of the leading-end portion A of FIG. 1 of the first example, in accordance with an embodiment of the present invention.

With reference now to FIGS. 1, 2 and 3, in accordance with an embodiment of the present invention, in FIG. 1, a perspective view of a head-slider 1 is shown; in FIG. 2, a plan view is shown of the head-slider 1 of FIG. 1; and, in FIG. 3, an enlarged view of a leading-end portion A of the head-slider 1 of FIG. 1 is shown. The head-slider in accordance with the first example creates a lift by utilizing the air bearing effect. Accordingly, the air-bearing surface (ABS) 10, which is the disk-facing side, of the head-slider 1 includes a leading-end shallow-recessed surface 4a and a pair of leading-end air-bearing portions 2a and 2b which are preceded and abutted by the leading-end shallow-recessed surface 4a. Behind the leading-end air-bearing portions 2a and 2b, side shallow-recessed surfaces 4b are respectively extended toward the trailing end. The side shallow-recessed surfaces 4b include a pair of center side air-bearing portions 2d and 2e disposed on respectively in trailing side areas of the side shallow-recessed surfaces 4b. A center air-bearing portion 2c including a magnetic-recording head 3, which is disposed at the center air-bearing portion 2c, is disposed at the widthwise center of the trailing end of the head-slider 1. The center air-bearing portion 2c is preceded by a center shallow-recessed surface 4c. A deep-recessed surface 5, disposed in the center of the ABS 10, is partially surrounded by the leading-end shallow-recessed surface 4a, leading-end air-bearing portions 2a and 2b, side shallow-recessed surfaces 4b, center shallow-recessed surface 4c, and center air-bearing portion 2c. Leading-end pads 6a and 6b are disposed at the respective leading corners of the leading-end shallow-recessed surface 4a on the ABS 10. The surfaces of the leading-end pads 6a and 6b and those of the leading-end air-bearing portions 2a and 2b disposed in the same plane. As shown in FIG. 3, the leading-end pads 6a and 6b are formed by recessing their outer side walls to side deep-recessed surfaces 7b and 7c when a leading-end deep-recessed surface 7a is formed. Therefore, in the case of etching technology that is used in manufacturing, the leading-end pads 6a and 6b can be formed by two etching steps without increasing the number of masks, because the rear and inner walls of the leading-end pads are shaped when the air-bearing portions are etched and the front, and outer walls are shaped when the deep-recessed surfaces are formed. The present configuration allows the leading-end pads 6a and 6b to be formed by processing the respective front corner areas of the air-bearing portions 2a and 2b. The respective leading side corners are rounded to reduce the contact stress that may be caused if the leading side corners touch the magnetic-recording disk. In the first example, the head-slider length Lx is 1.25 mm; the head-slider width is 0.7 mm; the depth of the shallow-recessed surfaces from the air-bearing portions is about 170 nanometers (nm); and the depth of the deep-recessed surface 5 from the air-bearing portions is about 1500 nm. A trailing end pad 8 is disposed in proximity to the trailing edge of the head-slider 1; and, the leading side 11 of the head-slider 1 is formed by machining.

Figure 4:
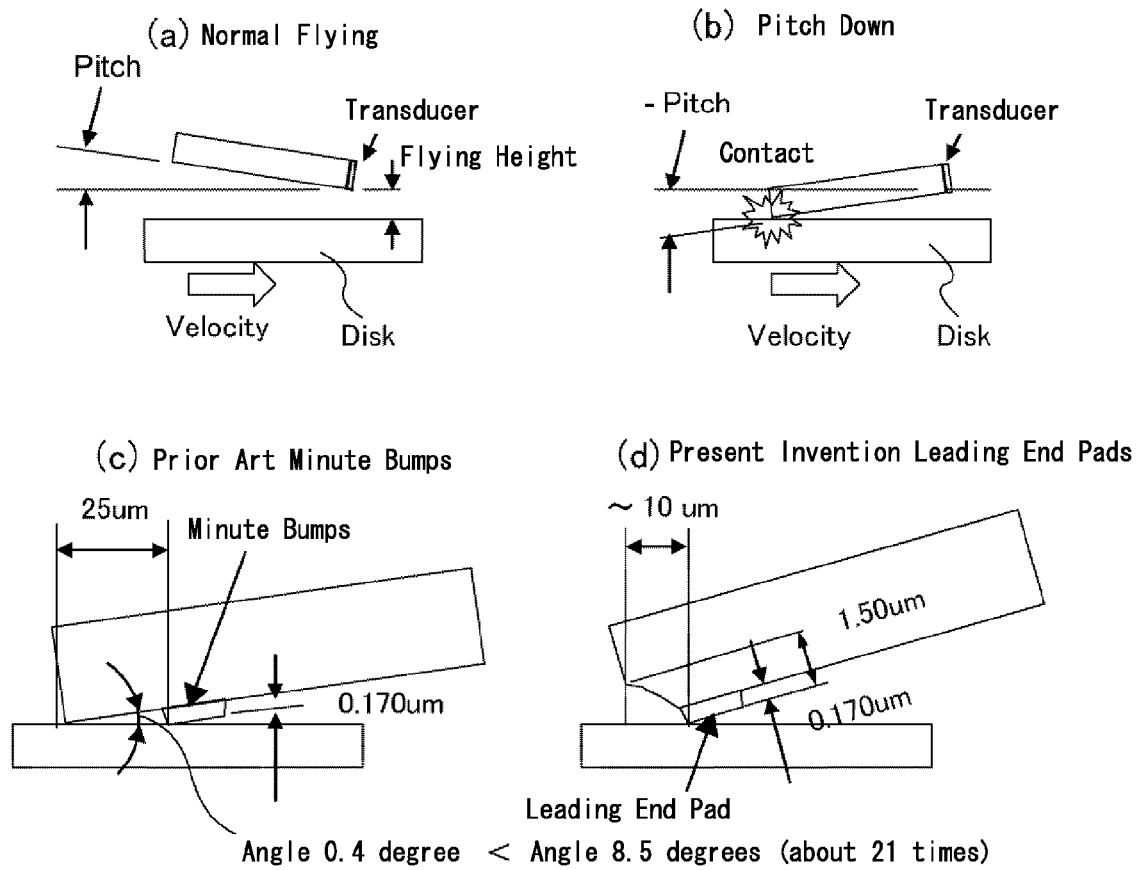
FIGS. 4(a), 4(b), 4(c) and 4(d) are side views of the head-slider and the magnetic-recording disk illustrating.

With reference now to FIGS. 4(*a*), 4(*b*), 4(*c*) and 4(*d*), side views of the head-slider and the magnetic-recording disk are shown that illustrate: in FIG. 4(*a*), normal flight of a head-slider; in FIG. 4(*b*), a pitch-down attitude of a head-slider causing a head-disk interaction (HDI); in FIG. 4(*c*), a prior art example of a head-slider used to mitigate a HDI; and, in FIG. 4(*d*), the first example of the head slider, in accordance with an embodiment of the present invention, used to mitigate a HDI. In FIG. 4(*a*), a normal flying state is shown. The flying height of the head-slider above the spinning magnetic-recording disk is largest at the leading end and smallest at the transducer section of the trailing end, where the magnetic-recording head is located. The pitch of the head-slider is positive as shown in FIG. 4(*a*). However, in the case of a HDD that includes a load/unload mechanism, if the head-slider touches the magnetic-recording disk due to some disturbance during loading as shown in FIG. 4(*b*), the head-slider is given a torque to turn down the leading side of the head-slider, forcing the head-slider into a forward leaning state, which is a state with a negative pitch, referred to as a pitch-down state, with the leading end in contact with the magnetic-recording disk. In the case of the prior art minute bumps, the point of contact with the magnetic-recording disk begins to move from the minute bumps towards the front end of the head-slider at about 0.4 degree, because the height of the minute bumps is small. This may damage the magnetic-recording disk, as shown in FIG. 4(*c*). In accordance with an embodiment of the present invention, the contact point is prevented from moving towards the front end of the head-slider from the leading-end pads, unless the angle exceeds about 8.5 degrees, which is about 20 times greater than 0.4 degree, because a deep-recessed surface is disposed the leading end of the head-slider, as shown in FIG. 4(*d*). Thus, in accordance with an embodiment of the present invention, the sliding reliability of the HDD is increased, because even if contact occurs at a large forward leaning angle, the head-slider can maintain an air inflow inlet and immediately obtain a lift to avoid the situation without causing damage to the magnetic-recording disk. In addition, the first example, in accordance with an embodiment of the present invention, is more effective in preventing rolling inclination of the head-slider. Furthermore, in accordance with an embodiment of the present invention, since the leading end includes the deep-recessed surface which precedes the leading-end pads, the length of the ABS 10 is defined by etching technology. Therefore, variation of fly height is reduced by suppressing the variation of the head-slider length to about a half as compared with defining methods, such as, rough lapping.

Example 2

Figure 5:
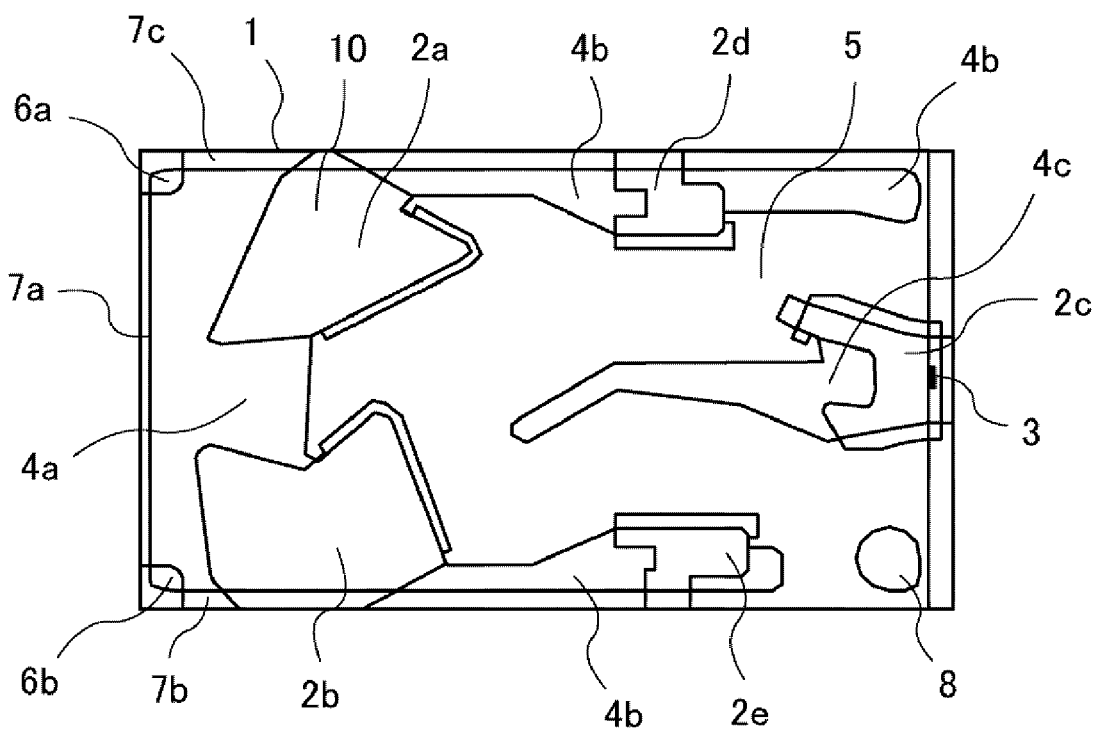
FIG. 5 is a plan view of a head-slider of a second example, in accordance with an embodiment of the present invention.

With reference now to FIG. 5, in accordance with an embodiment of the present invention, a plan view of a second example of a head-slider 1 is shown. The leading-end pads 6*a* and 6*b* are longer in the head-slider length direction than in the head-slider width direction. This configuration can somewhat reduce the influence of the leading-end pads 6*a* and 6*b* upon the flying characteristics of the leading-end air-bearing portions 2*a* and 2*b*. In the other ways, the effect of the configuration of the second example is substantially the same as the first example.

Example 3

Figure 6:
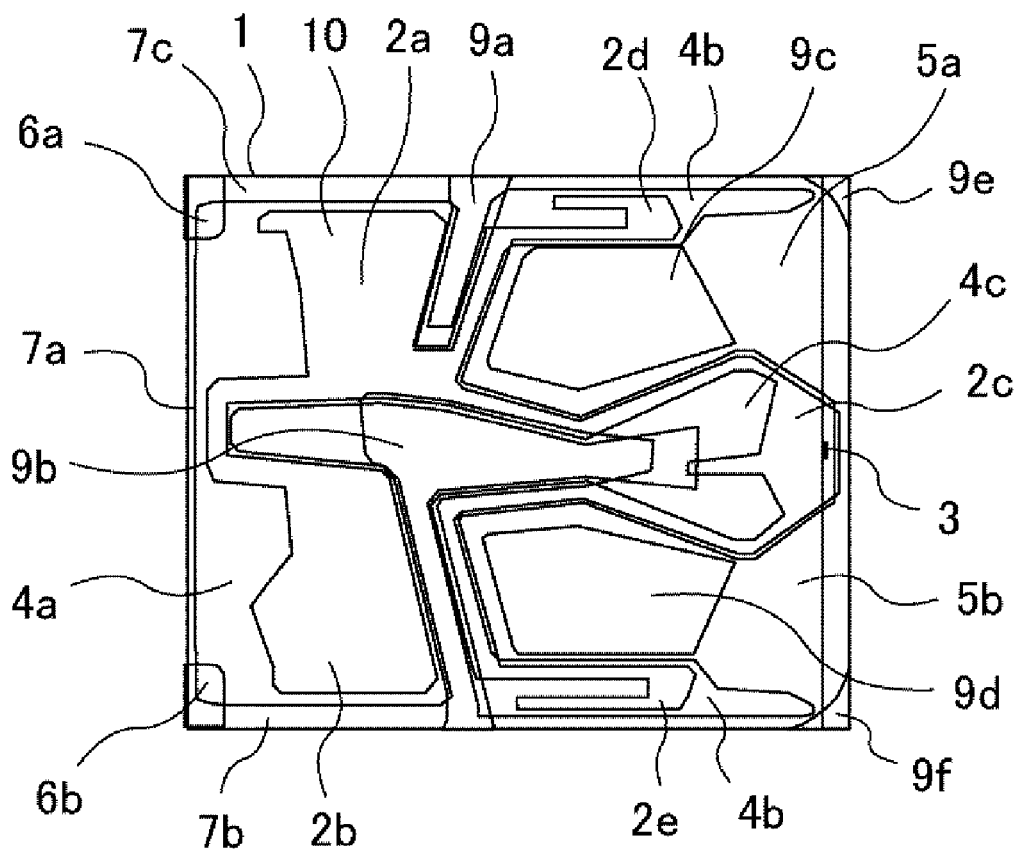
FIG. 6 is a plan view of a head-slider of a third example, in accordance with an embodiment of the present invention.

With reference now to FIG. 6, in accordance with an embodiment of the present invention, a plan view of a third example of a head-slider 1 is shown. Leading-end pads 6*a* and 6*b* are applied to a head-slider 1 with a size of 0.85 mm, which is the slider length, by 0.7 mm, which is the slider width. The leading-end includes the leading-end deep-recessed surface 7*a*, which precedes the leading-end pads 6*a* and 6*b*. In the ABS 10 and at the respective side corners of the trailing end of the head-slider 1, second deep-recessed surfaces 9*a*, 9*b*, 9*c*, 9*d*, 9*e* and 9*f* are disposed which are deeper than the first deep-recessed surfaces 5*a* and 5*b*. In another embodiment of the present invention, the depth of the second deep-recessed surfaces is 3 micrometers (μm) to 4 μm. The second deep-recessed surfaces in the ABS 10 are provided to improve the flight characteristics of the head-slider 1. The second deep-recessed surfaces 9*e* and 9*f* at the respective side corners of the trailing end are provided to reduce the contact stress that may be caused if contact occurs during load/unload operations, as described above. In the third example, the shorter head-slider length increases the effect of reducing variation of fly height due to variation in the length of the ABS. In the other ways, the effect of the third example is substantially the same as the first example.

Example 4

Figure 7:
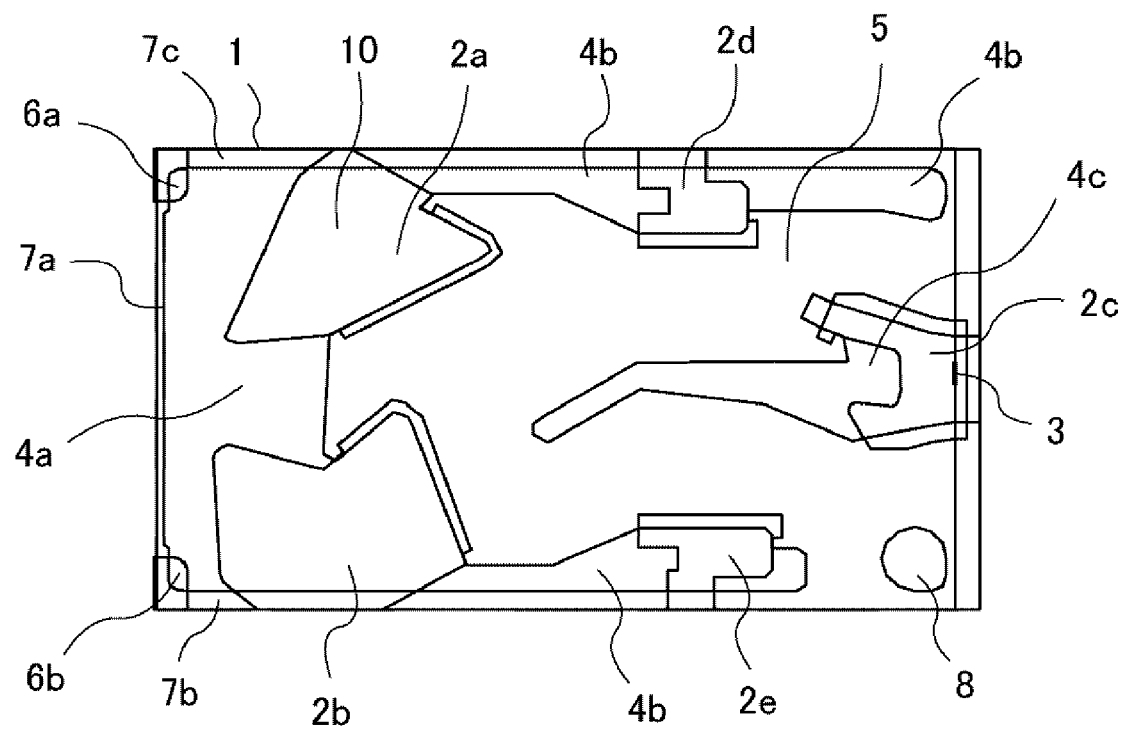
FIG. 7 is a plan view of a head-slider of a fourth example, in accordance with an embodiment of the present invention.

With reference now to FIG. 7, in accordance with an embodiment of the present invention, a plan view of a fourth example of a head-slider 1 is shown. The leading-end deep-recessed surface 7*a*, which precedes the leading-end pads 6*a* and 6*b*, is modified such that the width of the leading-end deep-recessed surface 7*a* is enlarged around the leading-end pads while the central portion is narrowed. Although this decreases the forward leaning angle beyond which the contact point moves to the front end of the head-slider, the effect of the fourth example is substantially the same as the first example in the other ways.

Example 5

Figure 8:
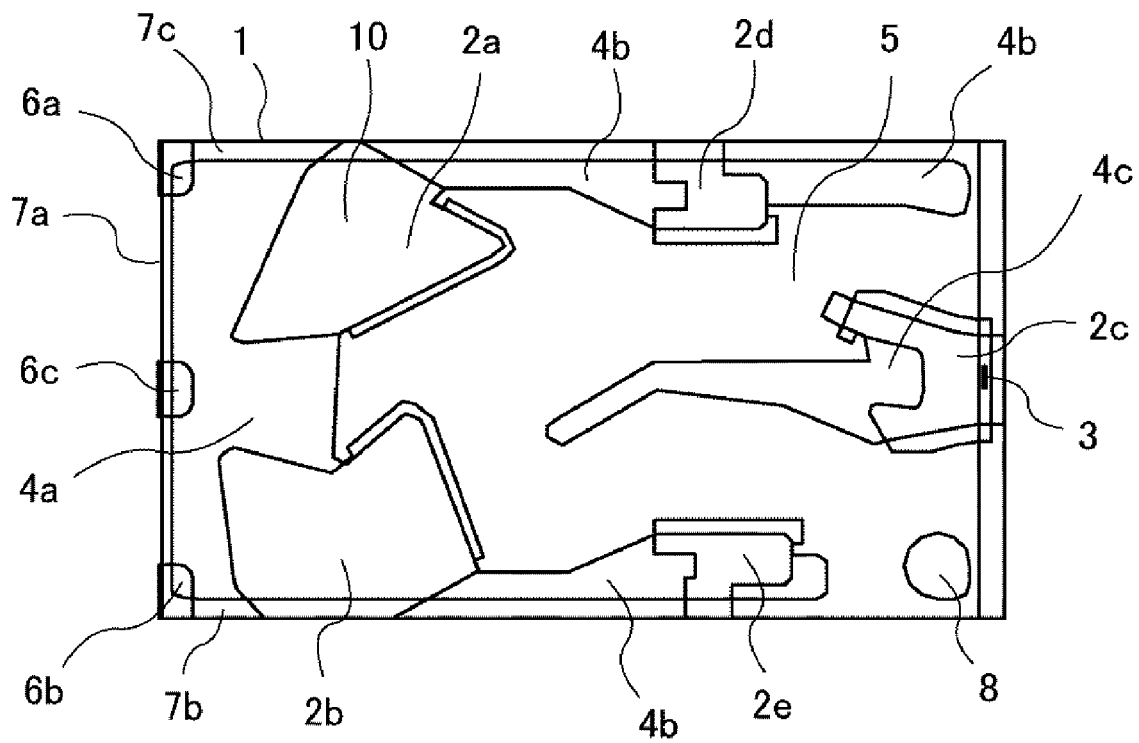
FIG. 8 is a plan view of a head-slider of a fifth example, in accordance with an embodiment of the present invention.

With reference now to FIG. 8, in accordance with an embodiment of the present invention, a plan view of a fifth example of a head-slider 1 is shown. An additional leading-end pad 6*c* is disposed at the center of the leading end of the head-slider 1. This maintains a steady contact behavior of a forward leaning head-slider 1, allowing faster avoidance of a severe HDI with the magnetic-recording disk. In the other ways, the effect of the fifth example is substantially the same as the first example.

Example 6

Figure 9:
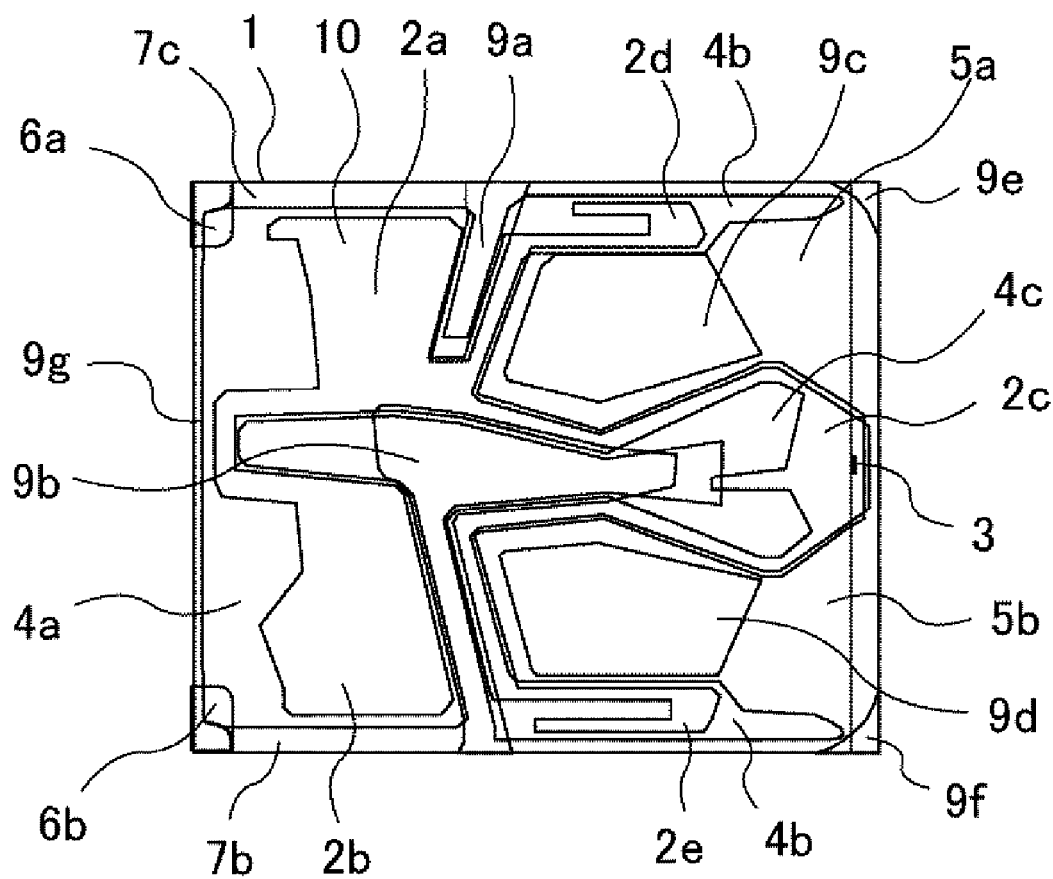
FIG. 9 is a plan view of a head-slider of a sixth example, in accordance with an embodiment of the present invention.

With reference now to FIG. 9, in accordance with an embodiment of the present invention, a plan view of a sixth example of a head-slider 1 is shown. The present invention is applied to a head-slider 1 with a size of 0.85 mm, which is the length, by 0.7 mm, which is the width. The leading end which precedes the leading-end pads 6*a* and 6*b* includes a second deep-recessed surface 9*g* which is deeper than the first deep-recessed surfaces 5*a* and 5*b* and has the same depth as the second deep-recessed surfaces 9a, 9b, 9c, 9d, 9e and 9f. As compared with the first example, this configuration can remarkably enlarge the forward leaning angle beyond which the contact point moves to the front end of the head-slider from the leading-end pads, because the leading end preceding the leading-end pads 6a and 6b can be deepened to 3 μm to 4 μm. In the other ways, the effect of the sixth example is substantially the same as the first example.

Example of Hard-Disk Drive Including a Head-Slider

Figure 10:
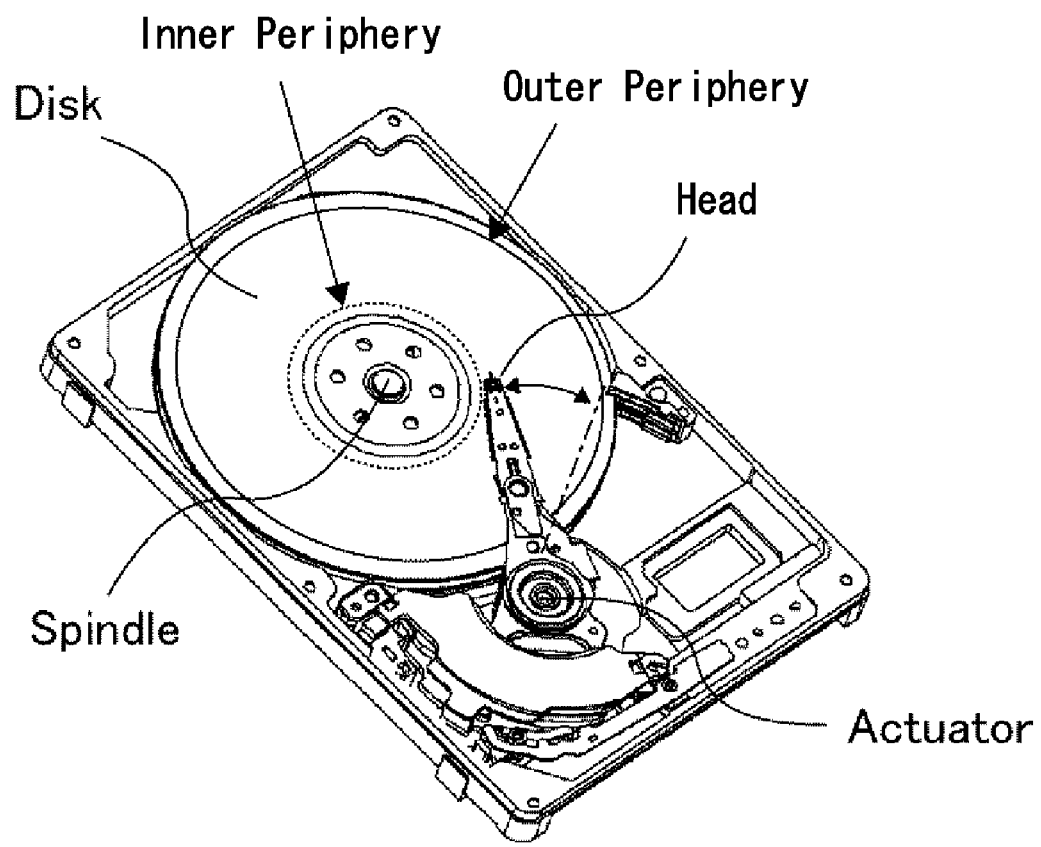
FIG. 10 is a perspective view of a HDD including a head-slider, in accordance with an embodiment of the present invention.

With reference now to FIG. 10, in accordance with embodiments of the present invention, a perspective view of a HDD including a head-slider 1 is shown. In accordance with embodiments of the present invention, the HDD includes a magnetic-recording disk and a head-slider, for example, any of the first through the sixth examples described above. The head-slider includes a magnetic-recording head and is attached at the distal end of an actuator configured to fly in proximity with a recording surface of the magnetic-recording disk. The magnetic-recording disk has an inside diameter and outside diameter and is mounted on a spindle that rotates to provide access for the magnetic-recording head to various tracks on the magnetic-recording disk for writing data to, and reading data from, the magnetic-recording disk, as the magnetic-recording is rotated by the actuator in a nominally radial direction of the magnetic-recording disk.

INDUSTRIAL APPLICABILITY

Embodiment of the present invention increase the sliding reliability of the HDD, because due to a deep-recessed surface disposed at the leading end in front of the leading-end pads, forward leaning hardly occurs; and, even if contact occurs at a large forward leaning angle, the head-slider can maintain an air inflow inlet and immediately obtain lift to avoid the forward leaning situation without causing damage to the magnetic-recording disk. In addition, in accordance with embodiments of the present invention, since the leading end of the ABS of the head-slider is defined by a milling process that uses a mask, variation of fly height is reduced by suppressing variation in the length of the head-slider.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-slider comprising:
a magnetic-recording head for reading data from, and writing data to, a magnetic-recording disk, wherein said head-slider is configured to fly in proximity with a recording surface of said magnetic-recording disk by an air-bearing effect; and
an air-bearing surface, said air-bearing surface comprising:
air-bearing portions;
shallow-recessed surfaces; and
a first deep-recessed surface;
said air-bearing portions configured to fly nearest to said magnetic-recording disk, said shallow-recessed surfaces having a first depth from said air-bearing portions, said first deep-recessed surface having a second depth from said air-bearing portions, said second depth being deeper than said first depth;
said air-bearing portions and said shallow-recessed surfaces configured to generate positive pressure, and said first deep-recessed surface, which is partially surrounded by said shallow-recessed surfaces and said air-bearing portions, configured to generate negative pressure; and
wherein a shallow-recessed surface is disposed in proximity of a leading edge of said head-slider, air-bearing portions are disposed such that said air-bearing portions are preceded and abutted by said shallow-recessed surface, a plurality of small leading-end pads having a same height as said air-bearing portions are disposed in proximity of said leading edge of said head-slider at least at each side of said shallow-recessed surface in proximity of lateral sides of said head-slider, a leading-end deep-recessed surface is disposed at a leading side of said leading-end pads, and a second deep-recessed surface deeper than said first deep-recessed surface is disposed at a leading side of said leading-end pads.

2. The head-slider of claim 1, wherein said leading-end deep-recessed surface at said leading side of said leading-end pads is formed by reactive ion etching.

3. The head-slider of claim 1, wherein said leading-end deep-recessed surface at said leading side of said leading-end pads is formed by ion milling.

4. The head-slider of claim 1, wherein a depth of said leading-end deep-recessed surface disposed at said leading side of said leading-end pads is equal to said second depth of said deep-recessed surface.

5. The head-slider of claim 1, wherein a side deep-recessed surface is disposed at an outer side of each of said leading-end pads.

6. The head-slider of claim 1, wherein said leading-end deep-recessed surface is disposed at said head-slider leading end of said shallow-recessed surface.

7. A head-slider comprising:
a magnetic-recording head for reading data from, and writing data to, a magnetic-recording disk, wherein said head-slider is configured to fly in proximity with a recording surface of said magnetic-recording disk by an air-bearing effect; and
an air-bearing surface, said air-bearing surface comprising:
air-bearing portions;
shallow-recessed surfaces; and
a first deep-recessed surface;
said air-bearing portions configured to fly nearest to said magnetic-recording disk, said shallow-recessed surfaces having a first depth from said air-bearing portions, said first deep-recessed surface having a second depth from said air-bearing portions, said second depth being deeper than said first depth;
said air-bearing portions and said shallow-recessed surfaces configured to generate positive pressure, and said first deep-recessed surface, which is partially surrounded by said shallow-recessed surfaces and said air-bearing portions, configured to generate negative pressure; and
wherein a shallow-recessed surface is disposed in proximity of a leading edge of said head-slider, air-bearing portions are disposed such that said air-bearing portions are preceded and abutted by said shallow-recessed surface, a plurality of small leading-end pads having a same height as said air-bearing portions is disposed in proximity of said leading edge of said head-slider at least at each side of said shallow-recessed surface in proximity of lateral sides of said head-slider, and a second deep-recessed surface deeper than said first deep-recessed surface is disposed at a leading side of said leading-end pads.

8. The head-slider of claim 7, wherein said second deep-recessed surface at said leading side of said leading-end pads is formed by reactive ion etching.

9. The head-slider of claim 7, wherein said second deep-recessed surface at said leading side of said leading-end pads is formed by ion milling.

10. The head-slider of claim 7, wherein a side deep-recessed surface is disposed at an outer side of each of said leading-end pads.

11. The head-slider of claim 7, wherein a leading-end deep-recessed surface is disposed at said head-slider leading end of said shallow-recessed surface.

12. A hard-disk drive, comprising:
a magnetic-recording disk; and
a head-slider comprising:
  a magnetic-recording head for reading data from, and writing data to, a magnetic-recording disk, wherein said head-slider is configured to fly in proximity with a recording surface of said magnetic-recording disk by an air-bearing effect; and
  an air-bearing surface, said air-bearing surface comprising:
    air-bearing portions;
    shallow-recessed surfaces; and
    a first deep-recessed surface;
  said air-bearing portions configured to fly nearest to said magnetic-recording disk, said shallow-recessed surfaces having a first depth from said air-bearing portions, said first deep-recessed surface having a second depth from said air-bearing portions, said second depth being deeper than said first depth;
  said air-bearing portions and said shallow-recessed surfaces configured to generate positive pressure, and said first deep-recessed surface, which is partially surrounded by said shallow-recessed surfaces and said air-bearing portions, configured to generate negative pressure; and
  wherein a shallow-recessed surface is disposed in proximity of a leading edge of said head-slider, air-bearing portions are disposed such that said air-bearing portions are preceded and abutted by said shallow-recessed surface, a plurality of small leading-end pads having a same height as said air-bearing portions are disposed in proximity of said leading edge of said head-slider at least at each side of said shallow-recessed surface in proximity of lateral sides of said head-slider, and a second deep-recessed surface deeper than said first deep-recessed surface is disposed at a leading side of said leading-end pads.

13. The hard-disk drive of claim 12, wherein said second deep-recessed surface at said leading side of said leading-end pads is formed by reactive ion etching.

14. The hard-disk drive of claim 12, wherein said second deep-recessed surface at said leading side of said leading-end pads is formed by ion milling.

* * * * *